United States Patent
Li

(10) Patent No.: US 8,004,983 B2
(45) Date of Patent: Aug. 23, 2011

(54) METHODS TO IMPROVE TRANSMISSION CONTROL PROTOCOL (TCP) PERFORMANCE OVER LARGE BANDWIDTH LONG DELAY LINKS

(75) Inventor: Qing Li, Cupertino, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 891 days.

(21) Appl. No.: 11/839,342

(22) Filed: Aug. 15, 2007

(65) Prior Publication Data

US 2009/0046717 A1      Feb. 19, 2009

(51) Int. Cl.
    *H04L 12/24* (2006.01)
(52) U.S. Cl. ........ 370/231; 370/235; 370/389; 370/392; 709/228; 709/237
(58) Field of Classification Search .................. 370/230, 370/230.1, 231, 235, 389, 392, 400, 401; 709/227, 228, 237
See application file for complete search history.

(56) References Cited

U.S. PATENT DOCUMENTS

| | | | |
|---|---|---|---|
| 6,018,530 A * | 1/2000 | Chakravorty | 370/471 |
| 6,046,979 A * | 4/2000 | Bauman | 370/229 |
| 6,119,171 A * | 9/2000 | Alkhatib | 709/245 |
| 6,310,884 B1 * | 10/2001 | Odenwald, Jr. | 370/412 |
| 6,687,833 B1 * | 2/2004 | Osborne et al. | 726/23 |
| 2006/0280168 A1 * | 12/2006 | Ozaki | 370/352 |
| 2007/0101154 A1 * | 5/2007 | Bardsley et al. | 713/186 |
| 2009/0003363 A1 * | 1/2009 | Benco et al. | 370/401 |

OTHER PUBLICATIONS

RFC 791, "Internet Protocol DARPA Internet Program Protocol Specification", Sep. 1981.*
Jacobson, V., et al. "TCP Extensions for High Performance", Cray Research, Network Working Group, May 1992, pp. 1-35.

* cited by examiner

*Primary Examiner* — Pankaj Kumar
*Assistant Examiner* — Duc T Duong
(74) *Attorney, Agent, or Firm* — SNR Denton US LLP

(57) ABSTRACT

TCP options are provided to address TCP performance problems during data exchanges over large bandwidth long delay communication links. These options address problems such as in sequence tail drops, inaccurate estimations of available bandwidth over a communication link, and slow responses to dynamic changes in link conditions.

10 Claims, 2 Drawing Sheets

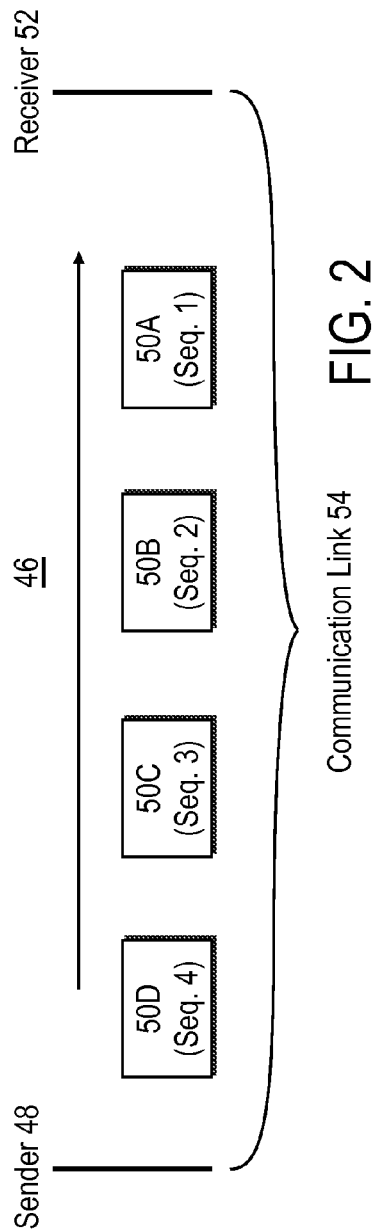
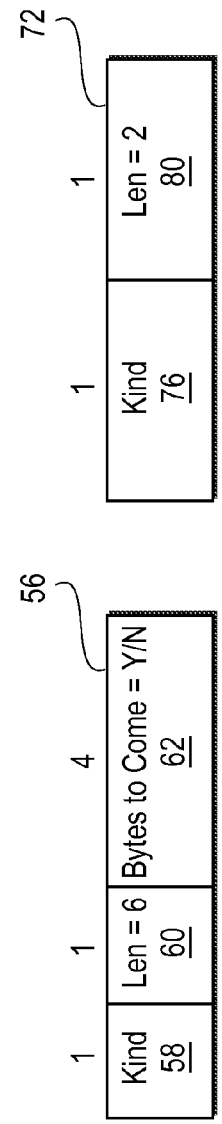
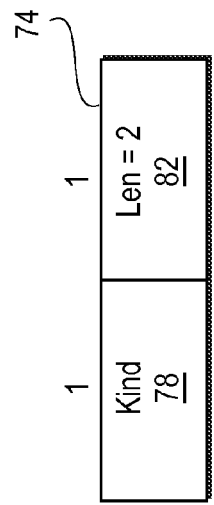
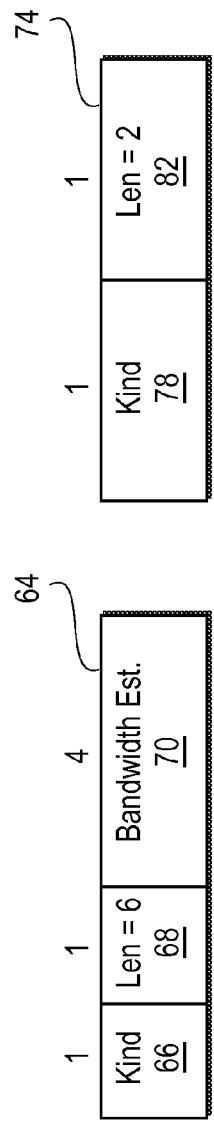

METHODS TO IMPROVE TRANSMISSION CONTROL PROTOCOL (TCP) PERFORMANCE OVER LARGE BANDWIDTH LONG DELAY LINKS

FIELD OF THE INVENTION

The present invention relates to Transmission Control Protocol (TCP) options to address TCP performance problems commonly encountered during data exchanges over large bandwidth long delay communication links.

BACKGROUND

The Transmission Control Protocol (TCP) is a transport-layer (OSI Layer 4) protocol that provides reliable data transfer between networked devices. Indeed, TCP is perhaps the most widely used transport protocol for traffic transferred across the Internet. All of the functionality required to deliver application data in a reliable fashion, e.g., sequencing, flow control, and data corruption, is embodied within TCP. To achieve this functionality, TCP breaks up an application data stream into discrete segments or packets, and attaches a TCP header to each packet. This packet (often with the addition of a separate IP header) is then passed to lower protocol layers for delivery over the communications network.

As illustrated in FIG. 1, a TCP header 10 has numerous fields that are used to communicate a variety of information. For example, the header includes a 16-bit source port address field 12 and a 16-bit destination port addresses field 14. Also included is a 32-bit sequence number field 16, which identifies the sequence number of the first data octet in the subject packet. Sequence numbers are used to ensure that arriving packets can be ordered as the sender intended and to associate a data packet with its corresponding acknowledgement. This allows the sender to estimate the current round-trip time (RTT) across the network. Sequence numbers are selected using a special algorithm to ensure that delayed data from an old connection is not incorrectly interpreted as being valid within a current connection.

Other fields in the TCP header include the acknowledgement sequence number 18, the data offset field 20, various single-bit flags (used to indicate various conditions) 22-32, and a window filed 34. The acknowledgment sequence number 18 is used to inform the remote end of the data that has been successfully received. The URG flag 22 is used to indicate whether the urgent pointer is valid. The ACK flag 24 is used to indicate whether the acknowledgment field is valid. The PSH flag 26 is set when the sender wants the remote TCP layer to push this data to the remote application. The RST flag 28 is used to reset the connection. The SYN (synchronize) flag 30 is used during the initial connection handshake, and the FIN (finish) flag 32 is used when closing the connection. The window field 34 is an indication of the available buffer space at the receiver.

A TCP checksum 36 is applied to a complete header that includes the source and destination addresses from an IP datagram. A TCP checksum is also applied to the complete TCP data contained in a single TCP packet. The final field in the TCP header is the urgent pointer 38, which, when added to the sequence number 16, indicates the sequence number of the final octet of urgent data if the urgent flag 22 is set. Following the header is a data field 40.

In addition to the above-described mandatory fields, a TCP header 10 can include various options in a TCP options field 42. Many options can be carried in a TCP header, and a number of such options have been defined by various Requests for Comments (RFCs). RFCs are both the name of the result and the process for creating a standard relating to technologies associated with the Internet. New standards are proposed and published as RFCs and subsequently reviewed by the Internet Engineering Task Force (IETF). A list of TCP options described in various RFCs is presented in Table 1 below.

TABLE 1

RFCs Related to TCP Options

| Kind | Length | Meaning | Reference |
|---|---|---|---|
| 0 | — | End of Option List | RFC 793 |
| 1 | — | No-Operation | RFC 793 |
| 2 | 4 | Maximum Segment Size | RFC 793 |
| 3 | 3 | WSOPT - Window Scale | RFC 1323 |
| 4 | 2 | SACK Permitted | RFC 2018 |
| 5 | N | SACK | REC 2018 |
| 6 | 6 | Echo (obsoleted by option 8) | RFC 1072 |
| 7 | 6 | Echo Reply (obsoleted by option 8) | RFC 1072 |
| 8 | 10 | TSOPT - Time Stamp Option | REC 1323 |
| 9 | 2 | Partial Order Connection Permitted | RFC 1693 |
| 10 | 3 | Partial Order Service Profile | RFC 1693 |
| 11 | — | CC | RFC 1644 |
| 12 | — | CC.NEW | RFC 1644 |
| 13 | — | CC.ECHO | RFC 1644 |
| 14 | 3 | TCP Alternate Checksum Request | RFC 1146 |
| 15 | N | TCP Alternate Checksum Data | RFC 1146 |
| 16 | — | Skeeter | Knowles |
| 17 | — | Bubba | Knowles |
| 18 | 3 | Trailer Checksum Option | Subramaniam & Bridges |
| 19 | 18 | MD5 Signature Option | RFC 2385 |
| 20 | — | SCPS Capabilities | Scott |
| 21 | — | Selective Negative Acknowledgements | Scott |
| 22 | — | Record Boundaries | Scott |
| 23 | — | Corruption experienced | Scott |
| 24 | — | SNAP | Sukonnik |
| 25 | — | Unassigned | |
| 26 | — | TCP Compression Filter | Bellovin |
| 27 | 8 | Quick-Start Response | REC 4782 |
| 28-252 | — | Unassigned | |
| 253 | N | RFC3692-style Experiment 1 | RFC 4727 |
| 254 | N | RFC3692-style Experiment 2 | RFC 4727 |

SUMMARY OF THE INVENTION

In one embodiment, the present invention provides for transmitting a TCP segment that includes a TCP header with an option field coded so as to indicate that additional TCP segments are being so transmitted. The option field may be coded with an option cue having a kind field, a length field and a field indicating that the additional TCP segments are being so transmitted. The kind field may be coded so as to be indicative of a TCP option used to indicate that the additional TCP segments are being so transmitted.

In a further embodiment, the present invention provides for transmitting a TCP segment that includes a TCP header with an option field coded so as to advise to the recipient of the TCP segment of a path (between the sender and the receiver, which may be comprised of multiple network segments that covers a large geographical area) bandwidth as perceived by a sender of the TCP segment. The option field may be coded with a kind field, a length field and a field indicating an estimate of the path bandwidth as perceived by the sender.

Still another embodiment of the present invention provides for transmitting a TCP segment with a TCP option coded so as to indicate to the receiver of the TCP segment that the sender of the TCP segment is capable of generating TCP segments coded so as to indicate that additional TCP segments are being transmitted.

Yet a further embodiment of the present invention provides for transmitting a TCP segment with a TCP option coded so as to indicate to the receiver of the TCP segment that the sender of the TCP segment is capable of transmitting TCP segments coded so as to advise the recipient thereof of a path bandwidth as perceived by the sender.

Still another embodiment of the present invention provides a TCP option configured to advise the recipient of a TCP segment including the TCP option that additional TCP packets are being transmitted by a sender of the TCP segment including the TCP option.

An additional embodiment of the present invention provides a TCP option configured to advise the recipient of a TCP segment including the TCP option of a path bandwidth as perceived by the sender of the TCP segment.

Further embodiments of the present invention provide a TCP option configured to indicate that the sender of a TCP segment including the TCP option is capable of transmitting additional TCP segments with TCP options coded to advise the recipient thereof that additional TCP packets are being transmitted by the sender.

Still further embodiment of the present invention provide a TCP option configured to indicate that the sender of a TCP segment including the TCP option is capable of transmitting additional TCP segments with TCP options coded so as to advise the recipient thereof of a path bandwidth as perceived by the sender.

These and other embodiments of the invention are described in detail below.

BRIEF DESCRIPTION OF THE DRAWINGS

The present invention is illustrated by way of example, and not limitation, in the figures of the accompanying drawings in which:

FIG. 2 illustrates the use of TCP sequence numbers in a conceptual fashion;

FIG. 3 illustrates an example of a TCP "bytes-to-come" option in accordance with an embodiment of the present invention;

FIG. 4 illustrates an example of a TCP "estimated bandwidth" option in accordance with an embodiment of the present invention;

FIG. 5 illustrates an example of a TCP "bytes-to-come permitted" option in accordance with an embodiment of the present invention; and FIG. 6 illustrates an example of a TCP "bandwidth-estimate permitted" option in accordance with an embodiment of the present invention.

DETAILED DESCRIPTION

Figure 1:
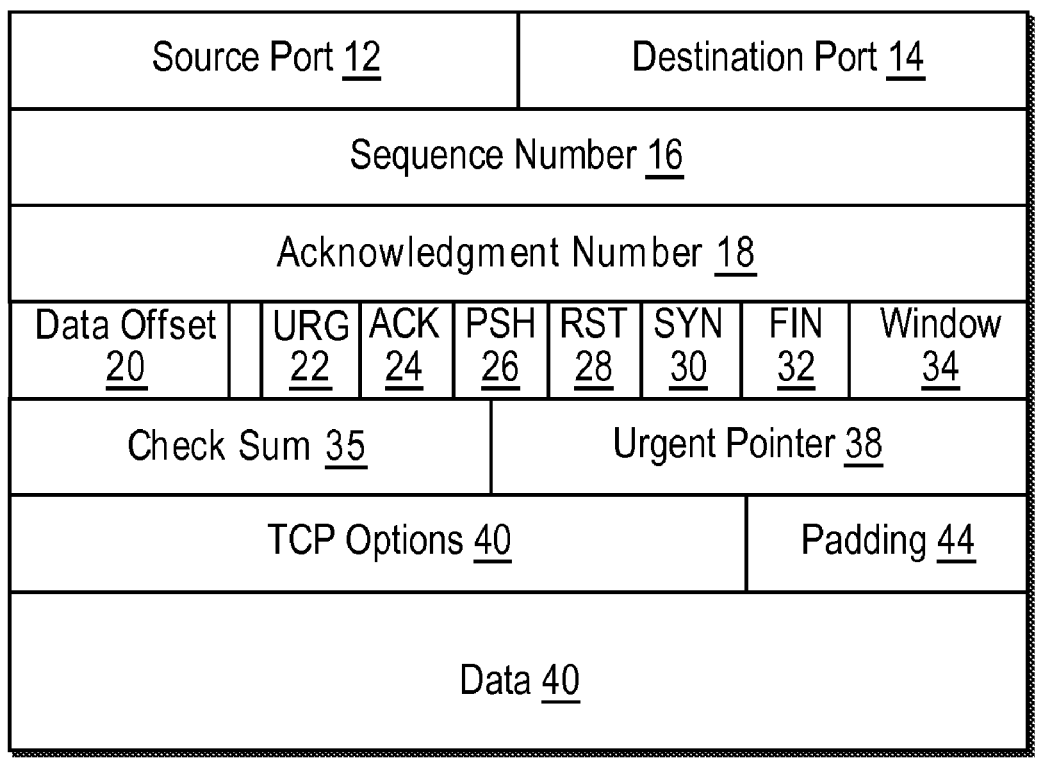
FIG. 1 illustrates a conventional TCP header.

Described herein are TCP options to address TCP performance problems commonly encountered during data exchanges over large bandwidth long delay communication links. Such problems include in sequence tail drops due to a TCP sender transmitting more than the available bandwidth of a path; inaccurate estimations of the available bandwidth; and slow responses to dynamic changes in the path conditions such as bandwidth, delay, congestion level, and error rate.

Although discussed with reference to various illustrated embodiments, the present invention is not intended to be limited thereby. Instead, these illustrations and descriptions are provided to aid the reader in better understanding the present invention. The invention, however, should only be measured in terms of the claims following this description.

In order to appreciate the advantages offered by the present invention, consider a scenario involving the transmission of data using TCP. Data from higher layer applications is encapsulated within so-called TCP segments with a TCP header forming part of each such segment. Depending on the type of communication network involved, these segments may be further encapsulated within IP datagrams, which are then sent to the data link layer for even further encapsulation into frames according to the technology used to physically convey the information over the network.

If the IP datagram is too large for the maximum transmission unit (MTU) of the underlying data link layer, it must be fragmented before it can be sent over the communication network. That is, the single, large IP datagram must be divided up into a number of smaller units, called fragments, that are sent separately over the network. Each fragment is tagged so that the receiver knows to expect further fragments.

Conventional TCP, however, is not aware of any fragmentation that occurs at the data link layer and relies on sequence numbers for alerting receivers that a higher layer data package has been divided up among a number of TCP segments. Refer, for example, to FIG. 2. In a network 46, sender 48 transmits TCP segments $50_a$-$50_d$ to a receiver 52 over a communication link 54. The segments each have an individual sequence number; for example, segment $50_a$ has sequence number 1, segment $50_b$ has sequence number 2, segment $50_c$ has sequence number 3, and segment $50_d$ has sequence number 4.

Of course, these sequence number indices are being used strictly for purposes of this example and should not be read to be actual sequence numbers used in TCP communications. In practice, only the first segment is assigned a sequence number and the receiver sends an acknowledgement value of the next segment it expects to receive. For example, if the sender 48 sends 4 segments with a sequence number of 100 (conceptually, the four segments would have sequence numbers of 100, 101, 102, and 103) then the receiver 52 would send back an acknowledgement of 104 since that is the next segment it would expect to receive.

Leaving aside the actual TCP implementation details and returning to the conceptual example introduced above with reference to FIG. 2, if segment $50_c$ is dropped before it is received at receiver 52, the TCP layer at receiver 52 will detect the loss by the gap in sequence numbers when fragment $50_d$ is received. Accordingly, the receiver 52 will advise the sender 48 to retransmit that segment. The loss of such an in-sequence segment will be noticed fairly quickly; on the order of the inter-segment delay time.

However, if the last segment of a sequence, segment $50_d$ in the present example, were to be dropped, the TCP layer at receiver 52 would not realize it was missing because nothing at the TCP layer advises the receiver to expect such a segment. Indeed, it would not be until the sender 48 realized that it had not received an acknowledgment of receipt of segment $50_d$ that the absence of that segment would be discovered. This is a much longer delay than the inter-segment delay time (or even multiples of the inter-segment delay time) associated with a missing in-sequence segment and TCP was not designed to cope with this in sequence "tail drop" problem.

TCP was not designed to handle the in sequence tail-drop problem and relies on the TCP Retransmission Timeout (RTO) to discover the packet loss condition. The TCP RTO is on the order of multiple segment Round Trip Time (RTT). For example, if the RTT is 100 ms, then the RTO may be 300 ms or 500 ms depending on the actual TCP implementation. Conventional TCP sender can ordinarily detect segment loss within one segment RTT only if the receiver is providing active feedback. This active feedback may be in the form of duplicate TCP acknowledgement (ACK) packets. The packet loss may be due to either congestion or link error.

To deal with the tail drop problem, the present invention proposes the use of a TCP option styled as a "more bytes to come" option. Much like lower layer protocols, such as a network layer protocol (such as IP) that uses a field to alert a receiver that more fragments relating to a single datagram are being sent, the present invention proposes the use of a flag in the TCP option field 42 to alert a receiver that additional TCP segments related to a larger application data unit are being sent. Of course, the invention is not limited to this use and the proposed TCP option may be used in connection with any TCP transmissions that need to affirmatively identify to a receiver when further TCP segments are being sent. By using the proposed "more bytes to come" option, a receiver can immediately (i.e., within approximately an inter-segment delay time) identify when a tail drop occurs and can instruct the sender to retransmit the missing segment.

Referring now to FIG. 3, an example of a bytes-to-come option cue 56 as would be transmitted by a sender is illustrated. This option cue may be included within the TCP options field 42 of the TCP header 10 and includes a kind field 58, a length field 60 and a bytes-to-come field 62. In one embodiment, the kind field is 1 byte long, the length field is one byte long and the bytes-to-come filed is 4 bytes long. The bytes-to-come field is set to yes or no, depending on whether further segments follow the subject TCP segment in a sequence. The kind field is set so as to identify the cue as a bytes-to-come option. The length field is set to indicate a length of six (6) bytes (i.e., the concatenated length of the three fields of the cue 56.

When the bytes-to-come field is set, this bytes-to-come cue 56 tells a receiver that the sender has more data to send, i.e., the current TCP segment is not the end of the transmission. As discussed above, while TCP is designed to handle random non-sequential packet loss, with in sequence tail-drop the receiver has no way of knowing a loss has occurred. In such cases, the TCP sender must wait for the expiration of multiple of the full RTO before retransmitting the dropped segments, which results in drastic reduction in TCP throughput over long delay links. With the bytes-to-come cue, the receiver knows more TCP data will arrive. Therefore when the expected segment does not arrive after a certain amount of time X has elapsed, the receiver will send back one or more ACK packets to indicate a loss, subsequently triggering fast retransmission.

The time X is much shorter than the RTO and is based on both statically configured and dynamically calculated parameters (e.g., two inter-segment delay times). The bytes-to-come value also allows the receiver to dynamically adjust its TCP receive buffers. In addition, the TCP receiver can convey this information to upper protocol layers and the owner application of the said TCP connection for various purposes.

A further new TCP option entitled "estimated bandwidth" is also proposed. The format of this TCP option 70 is shown in FIG. 4. The estimated bandwidth cue 64 includes a one-byte kind field 66, a one-byte length field 68 and a four-byte bandwidth-estimate field 70. The bandwidth-estimate field 70 is set by the TCP receiver and is used to advise the sender of the receiver's perceived path bandwidth.

When the estimated bandwidth information conveyed in the bandwidth-estimate field 70 is taken in conjunction with a TCP sender's own bandwidth estimation, the TCP sender can derive a much more accurate path bandwidth might otherwise be determined. This better estimation allows the TCP sender to either reduce or increase its transmission rate accordingly.

That is, packet loss across a communication path can be minimized, at least in part, by setting a TCP segment transmission rate according to an estimate of path bandwidth provided by the receiver using the estimated bandwidth option in a TCP header. Consequently the present invention allows the TCP sender to either reduce unnecessary transmission to avoid congestion and packet loss, or to better utilize the path bandwidth.

The use of the bytes-to-come and/or estimated bandwidth options may be negotiated at the time a TCP connection is established. Again, new TCP options may be used for these purposes. For example a "bytes-to-come permitted" option 72, illustrated in FIG. 5, may be used to indicate that a sender is capable of generating the bytes-to-come option 56 in subsequent TCP exchanges. Likewise, a "bandwidth-estimate permitted" option 74, illustrated in FIG. 6, may be to indicate that the sender is capable of generating the bandwidth-estimate option in subsequent TCP exchanges. Each of these options includes a one-bit kind field 76, 78, respectively, and a one bit length field 80, 82, respectively. The kind fields may be set to indicate the type of available options being advertised. Appropriate acknowledgements may be sent by a receiver in a return option of similar form.

Thus, TCP options to address TCP performance problems during data exchanges over large bandwidth long delay communication links have been described.

What is claimed is:

1. A method, comprising transmitting a Transmission Control Protocol (TCP) segment from a sender to a receiver, the TCP segment including a TCP header with an option field coded so as to indicate that additional TCP segments are being so transmitted.

2. The method of claim 1, wherein the option field is coded with an option cue having a kind field, a length field and a field indicating that the additional TCP segments are being so transmitted.

3. A method comprising transmitting a Transmission Control Protocol (TCP) segment from a sender to a receiver, the TCP segment including a TCP header with an option field coded so as to indicate that additional TCP segments are being so transmitted, wherein the option field is coded with an option cue having a kind field, a length field and a field indicating that the additional TCP segments are being so transmitted, and the kind field is coded so as to be indicative of a TCP option used to indicate that the additional TCP segments are being so transmitted.

4. A method comprising transmitting a TCP segment with a TCP option included in a header of the TCP segment, the option coded so as to indicate to a receiver of the TCP segment that a sender of the TCP segment is capable of generating TCP segments coded so as to indicate that additional TCP segments are being transmitted.

5. A network including a Transmission Control Protocol (TCP) sender and a TCP receiver, the TCP sender and TCP receiver configured to communicate with one another using a TCP message that includes an option comprising one or more fields configured to advise the TCP receiver of a TCP segment including the TCP option that additional TCP packets are being transmitted by the TCP sender.

6. A network including a Transmission Control Protocol (TCP) sender and a TCP receiver, the TCP sender and TCP receiver configured to communicate with one another using a TCP message that includes an option comprising one or more fields configured to indicate that the TCP sender is capable of transmitting additional TCP segments with TCP options coded to advise the TCP receiver that additional TCP packets are being transmitted by the TCP sender.

7. A method, comprising receiving a first Transmission Control Protocol (TCP) segment including a TCP header with an option field coded so as to indicate that additional TCP segments are being transmitted, detecting a TCP in sequence tail-drop condition, and requesting retransmission of a second TCP segment prior to expiry of a full TCP retransmission timeout period when at least one of the additional TCP segments are not received within a predetermined time period.

8. The method of claim 7, wherein the predetermined time period comprises a multiple of a dynamically computed inter-segment delay time according to current path conditions.

9. A method, comprising minimizing packet loss across a communication link by setting a Transmission Control Protocol (TCP) segment transmission rate according to an estimate of path bandwidth, which estimate is computed dynamically according to predefined algorithms using a combined path bandwidth provided by a receiver of the packets in a TCP option of a TCP header, with the path bandwidth estimated by the sender of the TCP packets.

10. A method, comprising maximizing path bandwidth utilization across a communication link by setting a Transmission Control Protocol (TCP) segment transmission rate according to an estimate of path bandwidth, which estimate is computed dynamically according to predefined algorithms using a combined path bandwidth provided by a receiver of the packets in a TCP option of a TCP header, with the path bandwidth estimated by the sender of the TCP packets.

* * * * *